United States Patent [19]

Monahan et al.

[11] Patent Number: 4,589,025

[45] Date of Patent: May 13, 1986

[54] DARK CURRENT MEASUREMENT AND CORRECTION FOR VIDEO FROM FIELD-TRANSFER IMAGERS

[75] Inventors: John F. Monahan, Burlington County; Joseph F. Hacke, Camden County; Thomas F. Casne, Burlington County, all of N.J.

[73] Assignee: RCA Corporation, Princeton, N.J.

[21] Appl. No.: 676,815

[22] Filed: Nov. 30, 1984

[51] Int. Cl.[4] ............................................. H04N 5/16
[52] U.S. Cl. .................................... 358/213; 358/221
[58] Field of Search ............... 358/213, 221, 212, 211; 357/24 LR

[56] References Cited

U.S. PATENT DOCUMENTS

| | | | |
|---|---|---|---|
| 4,293,877 | 10/1981 | Tsunekawa | 358/221 |
| 4,484,223 | 11/1984 | Tsunekawa | 358/221 |
| 4,496,982 | 1/1985 | Levine | 358/221 |
| 4,498,105 | 2/1985 | Crawshaw | 358/213 |
| 4,525,743 | 6/1985 | Wood, Jr. | 358/213 |

Primary Examiner—Gene Z. Rubinson
Assistant Examiner—L. C. Schroeder
Attorney, Agent, or Firm—Eugene M. Whitacre; Peter M. Emanuel; Lawrence C. Edelman

[57] ABSTRACT

In a television camera including an imager of the field-transfer type having A, B and C registers, an indication signal representative of dark current response accompanying the video signal is generated by comparing first and second signals representative of charge packets derived from the B and C registers, respectively. Specifically, the first signal is generated when the C register supplies signals supplied from the B register which includes substantially no photo-responsive components transferred from the A register. The second signal is generated when the C register supplies signals after the signal supplied from the B register have already been read out and while no new signals from the B register are being transferred into the C register and therefore represents absolute black.

10 Claims, 6 Drawing Figures

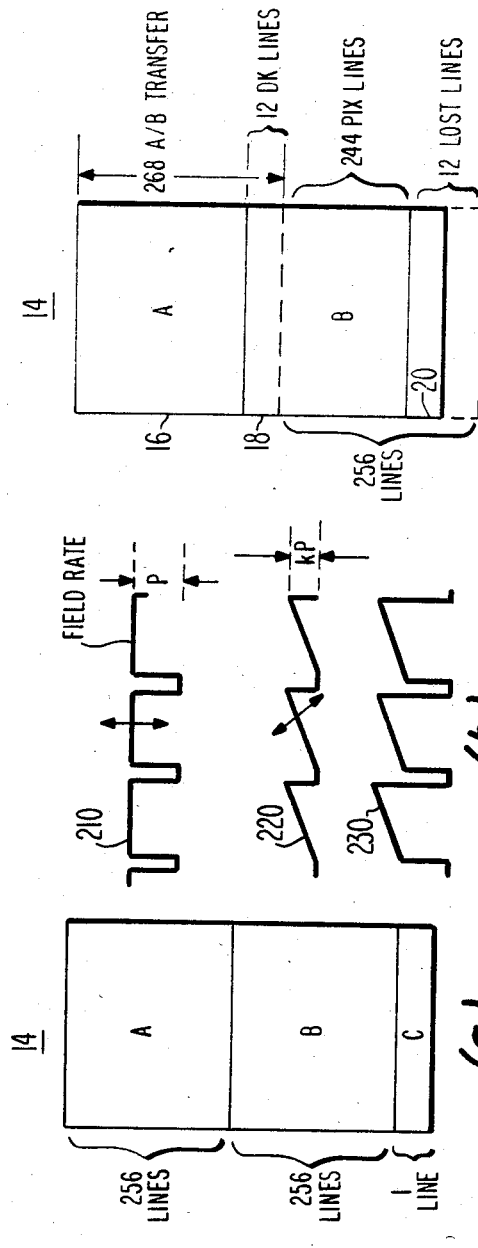
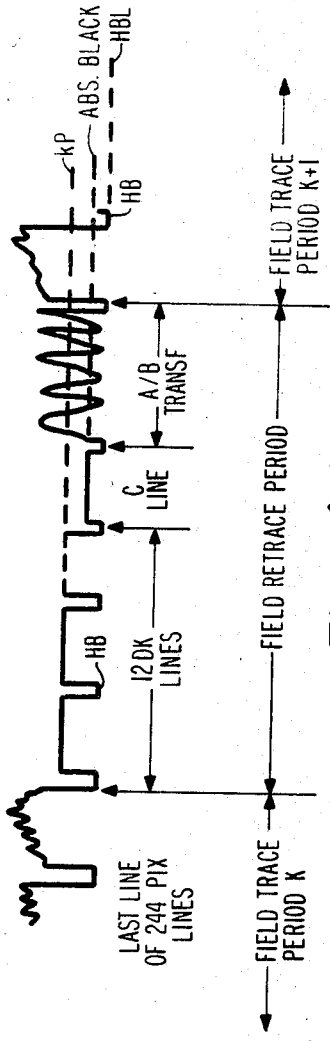
Fig. 2
Fig. 3(a)
Fig. 3(b)

DARK CURRENT MEASUREMENT AND CORRECTION FOR VIDEO FROM FIELD-TRANSFER IMAGERS

FIELD OF THE INVENTION

The present invention relates to solid-state imagers of the field-transfer type, such as the charge coupled device (CCD) type used in television cameras and, more particularly, to the problem of accurately measuring dark currents in video signals generated by such imagers.

BACKGROUND OF THE INVENTION

A vertical field-transfer type of CCD imager has a photo-responsive image A register exposed to radiant energy from a scene and has a field storage B register and an output line C register, both of the latter being masked from illumination. Radiant energy descriptive of the scene is focused onto the A register during an image integration interval corresponding substantially to a vertical trace period to generate a field of charge packets representative of the scene. These charge packets are shifted into the B register during a field transfer interval (commonly also called a "pull down" or A/B transfer interval) occuring within the next vertical retrace period. During the next vertical trace period the charge packets of each line of the field stored in the B register are shifted in parallel into the C register during respective horizontal retrace periods and then read out serially during the following horizontal trace periods until the entire field of charge packets in the B register is read out.

Solid-state imagers undesirably produce temperature-dependent dark currents which accumulate as charge in all of the registers of the imager. These dark currents appear as signal even in the absence of light. The accumulation of dark current in the A register during the field integration interval results in a dark current DC pedestal, which accompanies the image representative charge packets. Video signal field shading, a variation in black level across the picture field in the direction of line advance, is caused by successive lines of charge packets representative of image samples spending progressively longer periods of time in the B register of the imager. The increased length of time each line of charge packets spends in the B register allows a longer time for the accumulation of dark current thereby shifting the black level for each successive line further towards white. Although dark current does accumulate in the C register, its level is very small.

Therefore, it is desirable to obtain an indication signal responsive to dark currents which can be used for compensating the video signal against dark current response. Since the rate of dark current accumulation increases with increased temperature of the semiconductive substrate on which the imager is formed, it is desirable to derive the indication signal as a direct measure of an accumulation of dark current in an area of the same substrate as that which the imager itself is constructed upon.

Charge left in the B register after the field-trace period can, as described in U.S. Pat. application Ser. No. 382,422 filed May 27, 1982 by P. A. Levine, entitled "COMPENSATION AGAINST FIELD SHADING IN VIDEO FROM FIELD-TRANSFER CCD IMAGERS" be removed during field retrace and integrated over time to develop a signal that is a measure of dark current accumulation during imager field-trace. The area of the substrate over which remnant charge is accumulated is that of the B register, so the sensitivity of the measure of dark current accumulation is good since the indicating signal tends to have a large enough amplitude due to the above-described line-progressive build up to be accurately measured. The practical problem that one runs into in practicing this method is that the opaque mask over the B and C registers used to shield them from illumination does not, at least in imagers presently commercially available, adequately preclude photo-responsive components from being produced in the lines of the masked B register which are close to the unmasked A register. This photo-responsive component is clocked forward during the line-by-line advance of the charge packets through the B register in the field trace period and therefore appears in every line of the remnant charge clocked out of the B register during the field retrace period. This photoresponse results in an inaccurate measurement of dark current response.

In an alternative dark current response measurement method, this Levine application describes the use of a B register which is larger than the A register, in that it has an "extra" vertical charge transfer channel which does not receive charge packets from the A register and, therefore, solely accumulates dark current response. Time-division-multiplexing of the CCD output signal allows the charge packets of this extra B register charge transfer channel to be integrated for generating an indication signal which is proportional to imager dark current. In some imagers, such as those having relatively low dark current response, it may be difficult to generate a large enough indication signal for accurate measurement from a single extra B register charge transfer channel. Increasing the number of extra B register charge transfer channels may improve the accuracy of the dark current measurement, but at the undesirable expense of increasing the semiconductor area of the imager.

U.S. Pat. application Ser. No. 659,460 filed Oct. 10, 1984 in the name of P. A. Levine and entitled "IMPROVED DARK CURRENT SENSING WITH A SOLID-STATE IMAGER HAVING A CCD LINE REGISTER OUTPUT", describes a dark current response measurement method for field transfer CCD imagers wherein dark current accumulated in the C register is sensed for deriving the indication signal. In this method, read out of the C register is continued for an extra time interval after it has already been emptied of charge packets supplied from the B register and before the next line of charge packets from the B register is transferred into the C register. An integration over time of the signals read out of the C register during this extra time interval is used as a measure of dark current response. Although this method of measuring dark current response may be used quite succesfully for some imagers, recently fabricated imagers have a reduced dark current response which may be too small to be accurately measured by this technique, since only a small amount of dark current can accumulate in the one line C register.

In color television cameras, where gamma-correction is used, small video variations close to black level are stretched by about four times with respect to video signal variations in brighter portions of the televised scene. Therefore, even slight black level shifts caused by inaccurate dark current compensation can cause disturbing color shifts when the televised scene is reproduced.

Consequently, it is desirable to provide an accurate indication signal responsive substantially solely to integrated dark currents for use by the camera processing circuitry for purposes such as dark current correction.

SUMMARY OF THE INVENTION

In a television camera including a CCD imager of the field-transfer type, an indication signal representative of dark current response accompanying the video signal is generated by comparing first and second signals representative of charge packets derived from different portions of the imager such as the B and the C registers. Specifically, the first signal is generated when the C register supplies charge packets supplied from the B register which include substantially no photoresponse transferred from the A register. The second signal is generated when the output of the C register supplies charge packets after charge packets supplied from the B register have already been read out and while no new B register charge packets are transferred into the C register.

BRIEF DESCRIPTION OF THE DRAWING

FIGS 2a and 2b illustrate a field-transfer CCD imager and waveforms useful in understanding the nature of its dark current components, respectively;

FIGS. 3a and 3b illustrate the operation of the CCD imager of FIG. 2a in a manner which allows dark current measurement in accordance with the principles of the present invention and a waveform useful in understanding this operation, respectively.

DETAILED DESCRIPTION

Figure 1:
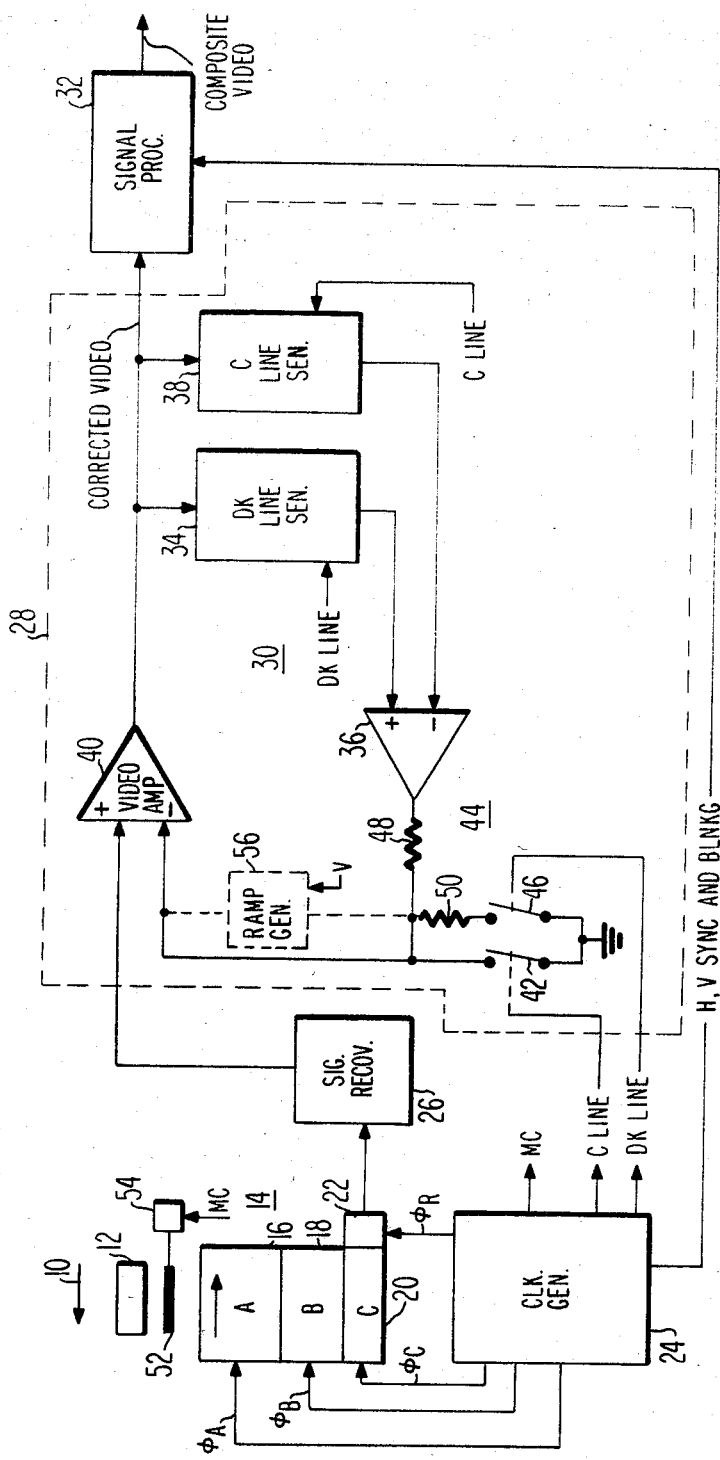
FIG. 1 illustrates in block diagram form a CCD camera including dark current measurement and video signal compensation in accordance with the principles of the invention.

In the camera of FIG. 1, radiant energy reflected or transmitted from an object 10 is focused by camera optics 12 onto the surface of a solid-state imager 14. Imager 14 is shown as a conventional CCD (charge-coupled device) imager of the vertical field-transfer type including an unmasked A register portion 16 responsive to radiant energy focused onto it by optics 12 and masked B and C register portions 18 and 20 substantially unresponsive to radiant energy. A charge sensor output stage 22, which may comprise a floating element in the charge transfer channel of C register 20 and a field-effect-transistor electrometer, supplies an output signal in voltage form in response to charge transfer from C register 20. Photoelectrons are generated in A register 16 in response to the focused radiant energy and accumulate as charge packets descriptive of object 10. The charge packets are constrained to specific locations by electrodes (not shown) arranged in horizontal rows (not shown) and channel stop regions arranged in vertical columns (not shown). B and C registers 18 and 20 are similarly arranged in rows and columns which are aligned with those of A register 16, with C register 18 having only one row.

Vertical motion of the accumulated charge packets representative of object 10 is controlled by clock signals $\phi_A$ and $\phi_B$, which may be uniphased or polyphased in nature, applied from a clock generator 24 to the electrodes of A register 16 and B register 18, respectively, of imager 14. During an image integrating interval (e.g., corresponding to the vertical trace period of the NTSC television standard) the $\phi_A$ clocks are interrupted and radiant energy responsive charge samples are developed in A register 16. After the integration interval, the accumulated charge samples are transferred in parallel down the vertical channels from A register 16 to B register 18 by synchronous application of the $\phi_A$ and $\phi_B$ clocks signals, respectively. As previously noted, this transfer interval, commonly called the "pull-down" or A/B transfer interval, occurs within the television vertical retrace period. At the end of the pull-down interval the charge packets from A register 16 have been transferred to B register 18 leaving the A register empty or devoid of signal-representative charge. During the following image integration interval, wherein the next field of charge packets is being developed in A register 16, the $\phi_B$ clock signals are applied to B register 18 such that the prior field of charge packets are transferred one row (i.e., one line) at a time in parallel form from B register 18 into the one-line C register 20. By application of the $\phi_C$ clock signals to C register 20, the charge packets of each line transferred into C register 20 are readout in serial fashion to output stage 22 during successive horizontal trace periods. Clock generator 24 supplies reset pulses ($\phi_R$) to output stage 22 to clamp its floating element to a defined reset drain potential following each image sample being sensed. The $\phi_C$ clock signals are also applied to C register 20 during the vertical retrace period so as to read out any remnant charge transferred into it from B register 18 during the A/B transfer interval.

The voltage signal supplied by output stage 22 in response to the received charge packets is applied to a signal recovery circuit 26, e.g., including known noise-reduction and pre-amplifier circuitry such as correlated double sampling, for developing a video output signal. Details of circuitry for performing correlated double sampling can be found in a book entitled "SOLID STATE IMAGING", by Jespers Van de Wielf and White published by Noordhoff-Leyden in 1976. The video output signal is applied to a video 28 which includes DC restoration and clamping circuitry (shown in detail in FIG. 4) and dark current compensation circuitry 30 which compensates the video signal against dark current response in accordance with the principles of the invention. A signal processor 32 is responsive to horizontal (H) and vertical (V) synchronization and blanking signals supplied from clock generator 24 for inserting synchronizing and blanking pulses into the video signal provided by video processor 28. Signal processor 32 also includes conventional video signal processing circuitry, e.g., including gamma correction circuitry, for developing at its output a composite video signal in a standard format, e.g., NTSC. A PAL or SECAM signal could also be supplied if imager 14 had an appropriate number of lines. If, for example, a color filter (not shown) is included in optics 12, signal processor 32 would also include decoder, matrixing and subcarrier circuitry for developing color components of the composite video signal at its output.

Briefly, dark current compensation circuitry 30 includes a signal sensor 34 for sampling the level of the video signal during a time period "DK LINE", to be specified later, when C register 20 is supplying charge packets which were supplied to it from B register 18 but which include substantially no photo-responsive components transferred from A register 16 to develop a first signal. This signal is supplied to the noninverting (+) input of a comparator 36. A signal sensor 38 samples the level of the video signal during a time period "C LINE", also to be specified later, when C register 20 is supplying charge packets after all the charge packets supplied from B register 18 have already been supplied and no new B register charge packets are being transferred into C register 20 to develop a second signal. This second signal is supplied to an inverting (−) input of comparator 36. The voltage developed at the output of comparator 36 is representative of the dark current response which accompanies the video signals and is used in a negative feedback manner to reduce or compensate for the dark current by applying it to an inverting (−) input of a video amplifier 40 connected between signal recovery circuit 26 and signal processing circuit 32. A more detailed description of the operation of dark current compensation circuitry 30 of FIG. 1 will be described later. However, first the generation and nature of the dark current response which is to be compensated for will be described with respect to FIGS. 2a and 2b.

As shown in FIG. 2a, for the NTSC format, CCD imager 14 has 256 lines in both the A and B registers, the C register having one line and being used for parallel-to-serial conversion of the parallel supplied charge packets from B register 18. In the NTSC system, the visible (active) field comprises approximately 244 lines. As a result there are "extra" lines in A an registers 16 and 18. Advantageously, the clocking of imager 14 is modified in accordance with an aspect of the present invention to use the "extra" lines in a manner which allows accurate measurement of the dark current response as will be described with reference to FIGS. 3a and 3b.

As previously noted, field transfer imagers are subject to undesirable black level shifts (shading or background signal level change which occurs across the entire raster) due to dark currents integrated within the imager which accompany the developed video samples. The dark current response of field transfer imagers, as well as other types of imagers, has a field rate DC or black pedestal component attributable to integration of dark current in the A register over the image integration interval. If this dark current component only could be read out directly from A register 16, it would be as illustrated by waveform 210 of FIG. 2b. Since imager dark currents are temperature-dependent, the level P of the DC component is also temperature-dependent as is indicated by a two-headed arrow.

Furthermore, in field transfer imagers, the line-by-line transfer of video representative charge packets from B register 18 to C register 20 results in a vertical rate staircase or ramp component of integrated dark current response having horizontal rate line-length steps which accompany the video signal. This staircase component has a minimum value for the first line read from B register 18 and a maximum value for the last visible line read from B register 18. The generation of this increasing staircase component is readily understood by realizing that the first line is clocked out by C register 20 almost immediately after the pull-down interval, thus having a minimum time in which to accumulate dark current response. On the other hand, successively increasing numbered lines remain in the B register for increasing numbers of horizontal trace periods. For example, the last visible line is supplied from C register 20 almost 1/60th of a second after the first line and thus has integrated much more dark current while in B register 18 than had the first line. This staircase component of dark current response accompanying the charge packets causes a slope in average brightness of the generated video signal which is perpendicular to the direction of line scan. This is commonly called field shading and is illustrated by waveform 220 of FIG. 2b ( the individual horizontal rate steps not being shown for simplicity) and has a maximum value which is a fraction of P. In the SID 403 imager currently available from RCA Corporation, Lancaster, Penn., the fraction, k, is approximately equal to 0.7 due to the reduced area of the signal handling portions of the B register as compared with the A register. The slope of the field shading is temperature-dependent, as indicated by a double-headed arrow on waveform 220. The combined effect of these imager dark current currents is illustrated by waveform 230 and results in an objectionably noticeable black level shifting.

In some CCD frame-transfer imagers, such as the SID 403 imager, black level shifts caused by the staircase component of the dark current are less noticeable than the optical black pedestal component of the dark current. Consequently, for the present, the staircase component will be ignored. However, the staircase component can be compensated for, if desired, as will be described later.

FIG. 3a illustrates the manner of operating imager 14 such that a video output signal illustrated by the idealized waveform of FIG. 3b is supplied to video processor 28. The main difference in operation from the previously described conventional operation, is that more lines of charge samples are transferred into B register 18 then were generated in A register 16. For example, although each of A and B registers 16 and 18 each contain 256 lines, the $\phi_A$ and $\phi_B$ clocks are operated simultaneously so as to effect 268 transfers from A register 16 to B register 18. This results in the generation of 12 phantom or dark (DK) lines near the top of B register 18 which contain substantially no photo-responsive component transferred from A register 16. The bottom 12 lines from A register 16 are lost, because they are transferred through B register 18 to C register 20 to quickly be clocked out of C register 20 individually during the A/B transfer interval. However, there are still, 244 active picture (PIX) lines stored in B register 18 which are sufficient to fully represent the visible television field. This shifting of the 256 line television field from A register 16 to B register 18 is illustrated by the dashed lines in FIG. 3a.

The waveform of FIG. 3(b) shows the last PIX line at the end of a field trace period K, a field retrace period and the first PIX line at the beginning of the next field trace period K+1. Horizontal rate blanking intervals (HB) separate active adjacent television lines. In the NTSC television system, the field retrace interval is 21 lines long. Thus, when the imager is operated as shown in FIG 3a, the field retrace period begins with readout from C register 20 of the twelve DK lines by simultaneously applying $\phi_B$ and $\phi_C$ clock signals to B register 18 and C register 20, respectively. Thereafter, a so called C line is provided by interrupting the application of $\phi_B$ clock signal to B register 18 while continuing the application of the $\phi_C$ clock signal to C register 20. This is followed by an A/B transfer interval which takes up the remaining eight lines worth of time in the field retrace period. Since the DK lines remained in B register 18 for approximately a full field period before they were clocked out from C register 20, their accumulated dark current level is substantially equal to the maximum level of ramp signal 220 of the FIG. 2(b), i.e., kP. Since the C line contains no charge packets transferred from either the A or B register, it represents "absolute" black. This C or absolute black line has a much lower level than the DK line. In accordance with an aspect of the invention, the C line is used as a reliable reference for measuring the dark current response.

Returning to the description of FIG. 1, C line sensor 38 is responsive to a C line sample signal supplied from clock generator 24 during the C line interval for sampling the C line as shown in FIG. 3(b) thereby providing a black level reference signal to the inverting input of comparator 36. A switch 42 is also responsive to the C line sample signal for coupling the output of comparator 36 to a camera reference level, i.e., signal ground, which disables the operation of the dark current compensation feedback loop so that the C line signal level can be properly sensed. DK line sensor 34 is responsive to a DK line sample signal supplied from clock generator 24 for sampling the video signal level during the time interval when one of the twelve DK lines is being supplied. The DK line sample signal is preferably timed to cause sampling of a DK line which was originally generated in B register 18 at a position as remote as possible from the lower edge of A register 16. This will avoid unwanted photoresponse in the sampled DK line caused by leakage under the edge of the B register light mask. The sampled DK signal level is applied to the noninverting input to comparator 36. The signal developed at the output of comparator 36 is an accurate measure of the B register dark current and is used as an indication signal for compensating for dark current response. A voltage divider 44 including a selectively conductive switch 46 responsive to the DK line sample signal and dividing resistors 48 and 50, operates to reduce the indication signal developed at the output of comparator 36 by a predetermined percentage, i.e., 30 percent, during the DK line sample time. The reduced indication signal is applied to the inverting input of video amplifier 40 and operates to shift the video signal at the output of amplifier 40 in an inversely proportional manner. Due to the feedback nature of the above-described circuitry, during the DK line sample time, the indication signal is driven to a level which equalizes the signal levels applied to the inputs of comparator 36. Sensors 34 and 38 include hold circuitry for maintaining their output signal levels at the end of their sample time periods. Therefore, during the time periods when the DK line sample signal does not cause conduction of switch 46 e.g., during the field trace period, the indication signal is increased by 30 percent. As previously noted, in the SID 403 imager, the maximum level of the staircase component of the dark current, i.e., the sampled DK line, is approximately 0.7 of the level of the dark current DC component, i.e., the A register DC pedestal of dark current which accompanies the video signal. Therefore, this increase in the level of the indication signal is the correct amount which is necessary to derive a dark current compensation signal for the A register dark current DC pedestal component, from a measure responsive to the maximum level of the B register staircase component of the dark current.

For preventing the DK lines from being contaminated with photo-responsive components resulting from light reaching A register 16 during the field retrace interval, in the illustrated embodiment a rotating shutter 52 is located between optics 12 and imager 14. Shutter 52 includes light opaque and light transparent portions and is rotated by a motor 54 responsive to motor drive (MD) signals supplied from clock generator 24 such that the opaque portions block light from reaching imager 14 during field retrace periods and the light transmissive portions pass light to imager 14 during field trace periods. interval. Shutter 52 could be eliminated if it were possible to substantially reduce photoresponse from appearing in the DK lines by some other means. For example, increasing the rate of the 268 A/B transfers would substantially reduce photoresponse in the DK lines, but would cause a greater clock signal power drain.

If it were desired to correct for the staircase component of the dark current generated by the journey of the A register charge packets through B register 18, a vertical rate ramp generator 52 illustrated in dashed lines in FIG. 1 could be added to dark current compensation circuitry 30 for providing a vertical rate ramp signal to the inverting input of video amplifier 40 having a ramp responsive to the level of the indication signal.

Figure 4:
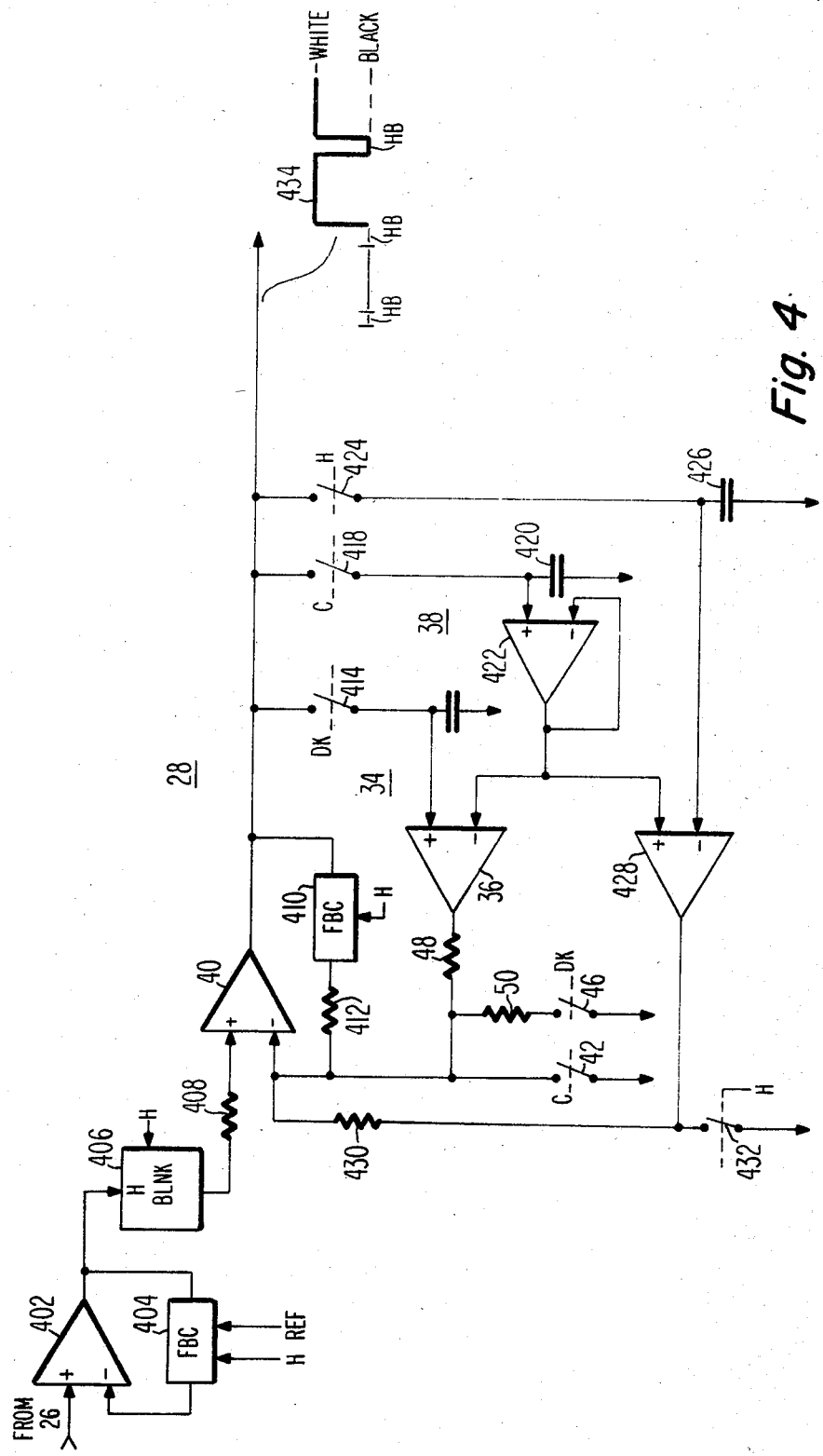
FIG. 4 illustrates, partially in block and partially in schematic diagram form, a preferred embodiment of a portion of the CCD camera of FIG. 1 including a further aspect of the invention.

FIG. 4 illustrates a detailed preferred embodiment of video processor 28 of the CCD camera of FIG. 1. Elements having substantially similar form and function to those previously described have the same reference number as was used in FIG. 1 and will only be briefly described during the description of FIG. 4. The video signal supplied from the output of signal recovery circuit 26 is applied to the noninverting input of a video amplifier 402. A horizontal rate feedback clamp 404 responsive to horizontal rate signals supplied from clock generator 24 is coupled between the output of amplifier 402 and its inverting input, for clamping the video signal to a reference voltage (REF). The REF voltage is a black level signal and can be derived from extra clocking of the C register during the horizontal retrace period, such as described in the aforenoted U.S. Pat. application Ser. No. 659,460. Next, the horizontal portions of the thus clamped video signal are blanked (i.e., gated to a black level such as signal ground) by a horizontal blanker 406 which is also responsive to horizontal rate signals supplied from clock generator 24. The clamped and horizontally blanked video signals are applied to the noninverting input of video amplifier 40 via a resistor 408. A horizontal rate feedback clamp 410 also responsive to horizontal rate signals supplied from clock generator 24 is coupled to the output of video amplifier 40 for applying, via a resistor 412, a correction signal to the inverting input of video amplifier 40 which corrects for DC offsets within video amplifier 40.

DK line sensor 34 comprises a switch 414 having one end coupled to the output of video amplifier 40 and the other end coupled to the junction of a capacitor 416 and the noninverting input of comparator 36. The other end of capacitor 416 is coupled to a camera reference voltage. C line sensor 38 comprises a switch 418 having one end coupled to the output of video amplifier 40 and its other end coupled to the junction of a capacitor 420 and an input to a buffer amplifier 422. The other end of capacitor 420 is also coupled to the camera reference voltage. Switch 414 is responsive to the DK sample signal and switch 418 is responsive to the C sample signal, both sample signals being supplied from signal generator 24. The output of buffer amplifier 422 is coupled to the inverting input of comparator 36.

In accordance with a further aspect of the invention, DC level shifts between the level of the horizontal blanking portions (illustrated as HBL in FIG. 3b) and black portions of the video signal are reduced by the addition of a further feedback loop. The further feedback loop comprises a switch 424 having one end coupled to the output of video amplifier 40 and its other end coupled to the junction of a capacitor 426 and the inverting input of a comparator 428. The conduction of switch 424 is controlled in accordance with the application of horizontal rate signals supplied from clock generator 24. The inverting input of comparator 428 receives the absolute black reference level supplied from the output of buffer amplifier 422. The output of comparator 428 is applied to the noninverting input of video amplifier 40, via a resistor 430. A switch 432 is responsive to the horizontal rate signal supplied from clock generator 24 for disabling this further feedback loop during the horizontal blanking intervals so that it does not disturb the operation of horizontal rate feedback clamp 410. Comparator 428 operates to provide a signal level to the inverting input of video amplifier 40 which results in setting the black level of the video signal during the horizontal blanking interval with the level of the measured C line, i.e., absolute black.

Waveform 434 is illustrative of the video signals supplied at the output of video amplifier 40 of FIG. 4 for the line preceeding and succeeding a black/white transition in a televised scene. Note that there is no pedestal offset between the horizontal blanking intervals (HB) and the picture intervals and that the white level of the active picture portion includes no dark current component which offsets it from the black level of the HB periods.

It should be appreciated that many modifications of the previously described circuits could be made which would still encompass the principles of the present invention. For example, the indication signal developed at the output of comparator 36 can be used in a feed forward manner, rather than in a feedback manner, for compensating the video signal against dark current response. For example, the indication signal could be applied to generate a line rate pedestal signal which can then be subtracted from the video signal provided by video amplifier 40. Furthermore, it should be clear that more or less than one DK or C line could be sensed. For example, switch 418 of C line sensor 38 illustrated in FIG. 4 could be conductive during only a portion of a horizontal retrace interval for sensing an absolute black signal level. However, this method would not be as desirable as the method previously described since it would be subject to inaccuracy due to the relatively short conduction time of switch 418.

Furthermore, other uses of the dark current indicating signal as derived in accordance with the invention are contemplated. For example, since the level of the dark current is temperature-sensitive, the dark current indication signal developed at the output of comparator 36 is also temperature sensitive. The temperature-sensitive indication signal can also be used to control thermoelectric cooling of the CCD imager to maintain dark current levels constant, as described by P. A. Levine in U.S. Pat. application Ser. No. 571,719, filed Jan. 18, 1984, entitled "DARK CURRENT LEVEL REGULATION IN SOLID-STATE DEVICES" and assigned to RCA Corporation.

The above-noted and other modifications are considered to be within the scope of the following claims.

What is claimed is:

1. Apparatus for deriving a signal indicating the level of dark current accompanying a video signal supplied from a field-transfer type solid-state imager including A, B, and C registers, comprising:
    means for developing a first signal substantially representative of only dark current response accumulated in a first portion of said imager;
    means for developing a second signal substantially representative of only dark current response accumulated in a second portion register of said imager, and
    means for comparing said first and second signals for developing said indicating signal.
2. The apparatus of claim 1 wherein:
    said first portion comprises said C register and said second portion comprises said B register.
3. The apparatus of claim 1 further including:
    a differential input video amplifier having said video signal supplied to its noninverting input and said indicating signal applied to its inverting input.
4. The apparatus of claim 3 wherein:
    said means for developing said first and second signals comprises respective first and second sample-and-hold circuits coupled to the output of said video amplifier; and
    said means for comparing comprises a comparator having first and second inputs coupled to said first and second sample-and-hold circuits, respectively.
5. A method for deriving a measure of dark current accompanying a video signal generated from a field-transfer type solid-state imager, including A, B, and C registers, said method comprising the steps of:
    developing a first signal having a level representative of absolute black level by sensing the video signal during a time period when the C register supplies charge packets after it has been emptied of charge packets supplied from the B register; and
    developing a second signal substantially representative of only imager dark current by sensing the video signal during a time period when the C register supplied charge packets are substantially representative of only B register dark current; and
    comparing said first and second signals for deriving said measure of dark current.
6. A CCD imager camera, comprising:
    a clock signal generator for developing A, B and C clocking signals;
    a CCD imager of field transfer type having an at least partially unmasked A register with first and second ends, a masked B register with a first end into which charge packets representative of image elements developed in said A register are loaded from the second end of said A register during a field transfer time, during which time said A and B registers are synchronously clocked by said A and B clock signals, respectively, and a masked C register into cascaded stages of which charge packets descriptive of image elements are parallelly loaded from a second end of said B register during line retrace and from which C register charge packets descriptive of image elements are serially supplied when clocked by said C clocking signals during line trace, the synchronous clocking of the A and B registers of said CCD imager being continued after field transfer so as to complete the movement of charge packets substantially free of image representative charge into the first end of said B register;

means responsive to said C register supplied charge packets for developing a first signal substantially representative of only dark current response accumulated in a first portion of said imager;

means responsive to said C register supplied charge packets for developing a second signal substantially representative of only dark current response accumulated in a second portion of said imager; and means for comparing said first and second signals for developing a signal indicative of a dark current accumulated in said imager.

7. The apparatus of claim 6 wherein:
said first portion comprises said C register and said second portion comprises said B register.

8. The camera of claim 6 further including:
a shutter for blocking light from reaching said CCD imager during time periods when said A and B registers are synchronously of clocked and for allowing light to reach said imager during time periods said A register develops said charge packets representative of image elements.

9. The camera of claim 6, wherein
said signal indicative of a dark current accumulated in said imager is used for compensating said signals supplied from said C register against dark current accumulated in said register.

10. The camera of claim 7, wherein:
said second signal is developed in response to said charge packets moved into said first end of said B register which are substantially free of image representative charge.

* * * * *

UNITED STATES PATENT AND TRADEMARK OFFICE
CERTIFICATE OF CORRECTION

PATENT NO. : 4,589,025

DATED : May 13, 1986

INVENTOR(S): John F. Monahan, Joseph F. Hacke & Thomas F. Casne

It is certified that error appears in the above-identified patent and that said Letters Patent is hereby corrected as shown below:

Col. 4, line 47, after "video" (second occurrence), -- processor -- should be added.

Col. 12, line 3, "of" should be deleted.

Signed and Sealed this

Thirteenth Day of January, 1987

Attest:

DONALD J. QUIGG

Attesting Officer     Commissioner of Patents and Trademarks